US 6,678,910 B2

(12) United States Patent
Smith (10) Patent No.: US 6,678,910 B2
(45) Date of Patent: Jan. 20, 2004

(54) FULLY FLOATING GANGWAY (76) Inventor: Dave W. Smith, 238 Scarboro Avenue S.W., Calgary, Alberta (CA), T3C 2H3

( * ) Notice: Subject to any disclaimer, the term of this patent is extended or adjusted under 35 U.S.C. 154(b) by 13 days.

(21) Appl. No.: 10/073,325

(22) Filed: Feb. 13, 2002

(65) Prior Publication Data

US 2003/0074749 A1 Apr. 24, 2003

Related U.S. Application Data (60) Provisional application No. 60/330,127, filed on Oct. 19, 2001.

(51) Int. Cl.$^7$ .............................................. E01D 15/24
(52) U.S. Cl. ....................................................... 14/69.5
(58) Field of Search ................................ 14/69.5, 71.1, 14/72.5, 73.5; D34/32

(56) References Cited

U.S. PATENT DOCUMENTS

| | | | | |
|---|---|---|---|---|
| 2,449,829 A | * | 9/1948 | Agren ......................... | 14/69.5 |
| 3,274,629 A | * | 9/1966 | Gearon et al. ................ | 14/71.1 |
| 3,296,638 A | * | 1/1967 | Morlon ........................ | 14/73.5 |
| 3,299,457 A | * | 1/1967 | Harris .......................... | 14/69.5 |
| 3,538,528 A | * | 11/1970 | Porter et al. .................. | 14/71.5 |
| 3,710,961 A | | 1/1973 | Bomstein | |
| 3,941,337 A | | 3/1976 | Mölter et al. | |
| 4,606,090 A | * | 8/1986 | Beard ........................... | 14/72.5 |
| 4,844,681 A | | 7/1989 | Pierre et al. | |
| 5,065,468 A | * | 11/1991 | Sherrod ....................... | 14/72.5 |
| 5,085,165 A | * | 2/1992 | Reed ............................ | 114/362 |
| 5,160,236 A | * | 11/1992 | Redding et al. .............. | 414/537 |
| 5,253,410 A | * | 10/1993 | Mortenson ................... | 29/436 |
| 5,853,150 A | | 12/1998 | Kuchenbrod | |
| 5,950,266 A | * | 9/1999 | Streeter et al. .............. | 14/69.5 |
| 6,234,272 B1 | | 5/2001 | Plentl, Jr. | |
| 6,533,525 B2 | * | 3/2003 | Haid et al. ................... | 414/522 |

OTHER PUBLICATIONS

Turbo Way, Turbo Way Passenger Ramp, product brochure, 4 pages.

* cited by examiner

Primary Examiner—Gary S. Hartman
(74) Attorney, Agent, or Firm—Sean W. Goodwin (57) ABSTRACT A fully floating gangway comprises a movable frame sandwiched movably in an operating plane between lower and upper parallel bearing surfaces which are supported from and positioned below a first platform. A gangway extends from the frame's front end for extending to another platform such as an aircraft doorway so that the gangway can be aligned therewith by manipulating the frame in the operating plane. Preferably the frame and bearing surfaces are supported in a mobile structures such as passenger ramp. The gangway is preferably pivoted from the frame for adapting to differential elevations. The pivoting gangway can be counterbalanced for ease of manipulation. A braking system is provided to lock gangway against movement once positioned.

26 Claims, 10 Drawing Sheets

FULLY FLOATING GANGWAY

CROSS REFERENCE TO RELATED APPLICATION

This application is a regular application of U.S. Provisional Patent application Serial No. 60/330,127 filed on Oct. 19, 2001, the entirety of which is incorporated herein by reference.

FIELD OF THE INVENTION

The present invention relates to elevation and alignment variable gangways which extend and bridge a gap such as between two misaligned platforms.

BACKGROUND OF THE INVENTION

There are often situations where one must bridge a gap between discontinuous surfaces or platforms using a structural surface, like a gangway, which is sufficient to support cartage or passenger traffic. Gangways are used particularly in cargo or passenger loading between a dock and a boat, a ramp and an aircraft, or a loading platform and a vehicle.

One example is a situation where an access ramp is placed adjacent an airplane cabin access doorway. In order to insert a gangway, the ramp will usually have an exit platform which is adjusted approximately to the same elevation as the sill of the aircraft doorway. Further, the surface must usually be carefully positioned so as to be aligned with the doorway. In many instances, it is only important that the gangway reach the sill of the doorway's platform. However, the alignment is particularly important when there are fixed hand rails projecting from the doorway's platform; these rails act to constrain access. In such a case, the gangway must be precisely aligned to pass between the hand rails and reach the doorway's platform recessed through the rails.

Again in an aircraft context, the boarding and deplaning of disabled persons must be addressed and can be particularly challenging because neither the aircraft nor the boarding device can be accurately positioned. Unlike large commercial aircraft, smaller regional aircraft have aircraft cabin doors which cannot be aligned with the usual boarding tunnels and motorized bridges. Instead, the cabin doors comprise a pivoting door the inside of which is fitted with stairs for boarding and deplaning. When the door is pivoted outwardly from the aircraft fuselage to open the aircraft doorway, the distal end of the door reaches downwardly to the tarmac. The inside of the aircraft door forms a staircase and side hand rails pivot into an upright and supporting position. Certainly, the stairs are difficult to navigate by the mobility-impaired and impossible for accommodating wheelchairs. Further, the cabin door and particularly the side handrails, tend to block many of the usual apparatus adapted to provide elevated access to the aircraft doorway, including wheelchair lifts and inclined ramps. It is difficult to successfully extend outwards to bridge between the platforms while still being able to pass between the narrow, constricting side handrails. It is also important to be able to secure the gangway from slipping from the platform during use.

SUMMARY OF THE INVENTION

The difficulties associated with alignment between two, often narrow, passageways are obviated using a fully floating gangway. In one embodiment, the floating gangway is supported in a mobile ramp and comprises a movable frame sandwiched movably in an operating plane between lower and upper parallel bearing surfaces. A bridging element or gangway extends from the frame's front end for extending to another platform such as an aircraft doorway. Manipulation of the frame forwards, rearwardly, and rotationally enables the gangway to be aligned with the doorway. Further, the gangway can be pivotally connected to the frame so as to enable vertical adjustment of the gangway so as to adapt to differential elevations of the proximal and distal ends of the gangway. In the case of aircraft or watercraft, this elevation can also vary during the boarding process. The floating gangway is equally adaptable to structures such as mobile ramps, stationary jet bridges, warehouse loading docks and the like.

In one aspect of the invention, a method for aligning a gangway between a first platform and a second platform is provided comprising the steps of:
 supporting a frame between two spaced and parallel bearing surfaces which are positioned below the first platform, the frame being movable in an operating plane parallel to the bearing surfaces;
 supporting a proximal end of a gangway from the frame and extending a distal end of the gangway to the second platform; and
 manipulating the frame in the operating plane so as to align the supported gangway with the second platform.

Preferably, alignment is further aided by pivoting the proximal end of the gangway from the frame so as to align the elevation of the distal end of the gangway with the second platform. Preferably, in applications associated with the damage critical components of aircraft, it is advantageous to hand manipulate the gangway to minimize risk to the aircraft from insensitive powered movements. To this end, counterbalancing of the gangway about its pivot aids in easing the hand manipulation. Powered assisted manipulation can also be applied. Further, to provide enhanced continuity, one can independently bridge between gangway and the platform using a flap so as to provide a contiguous surface therebetween as the frame is being manipulated. Once manipulated, it is advantageous to lock the gangway to avoid movement in use, such a locking capability being particularly desirable in situations where there is a risk of movement and safety is an issue.

In a broad apparatus aspect, a gangway is supported by a movable frame positioned below a first platform and substantially parallel thereto, the frame having a front end and a rear end and movable at least to translate and rotate in an operating plane, and preferably laterally as well. Preferably, said operating plane is defined by movably supporting and sandwiching the frame between upper and lower bearing surfaces, the lower bearing surface positioned below the frame and parallel to the operating plane and the upper bearing surface positioned spaced above and parallel to the operating plane. A bridge extends forward from the frame's front end for extending between the frame and the second platform and so that, as the frame moves, the bridge also translates and rotates with respect to the second platform. Preferably, the bridge is pivotally connected at a hinge to the frame and is counterbalanced to make the frame easier to manipulate. A flap between the bridge and first platform forms a contiguous gangway and ensures continuity in all platform traffic situations.

In one embodiment, the frame is movably supported between the upper and lower surfaces by one or more first bearings, preferably laterally spaced swiveling castors, for moveably supporting the front end and one or more second bearings, such as another swiveling castor, positioned rearwardly of the first bearings. Bridge weight loads the front end of the frame and causes the front castors to bear against the lower bearing surface and causes the rear end of the frame to rotate upwardly so that the rear castor bears upwardly against the upper bearing surface.

DETAILED DESCRIPTION OF THE PREFERRED EMBODIMENTS

Figure 1:
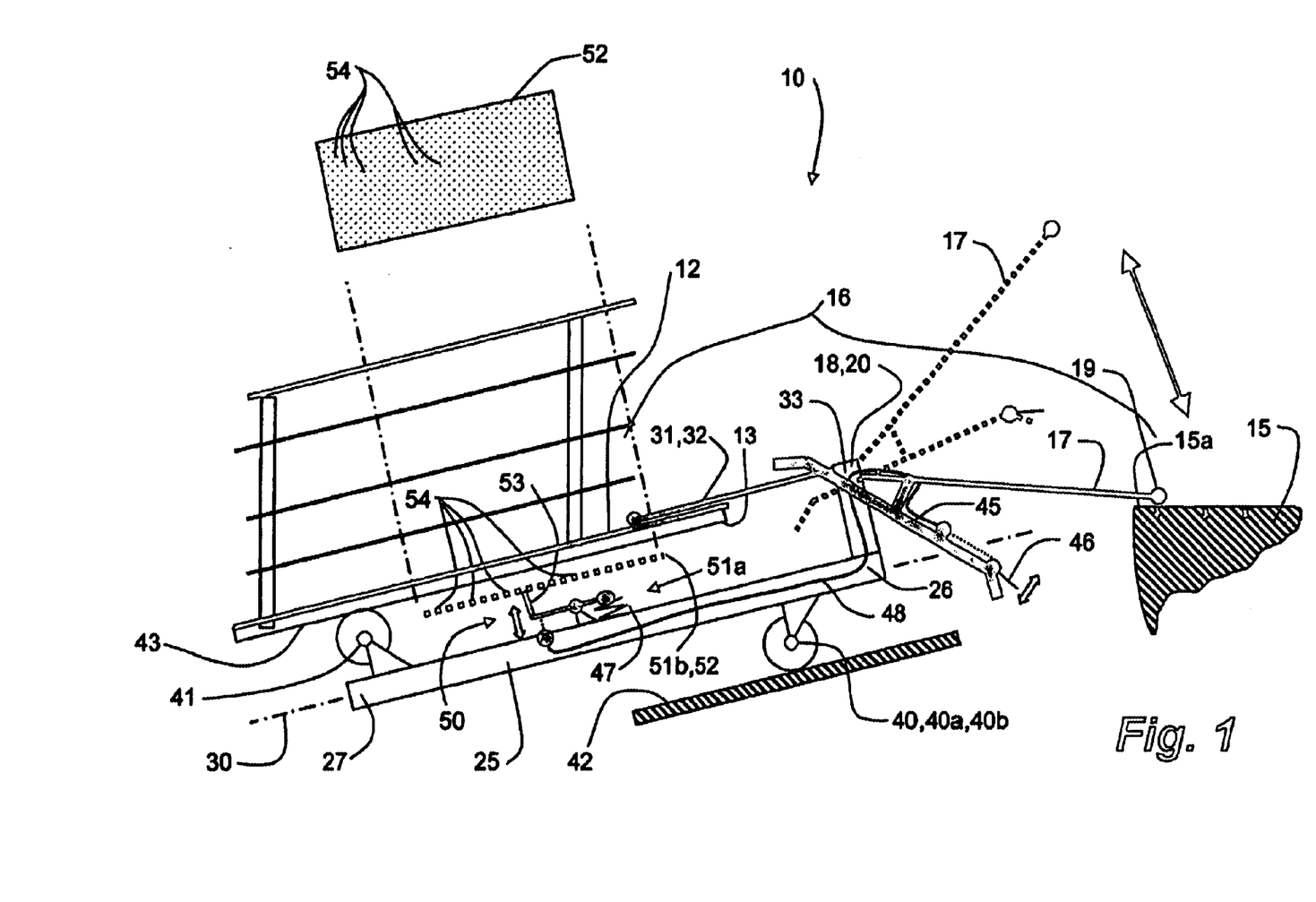
FIG. 1 is a side schematic view of one embodiment of the invention and an exploded plan view of one embodiment of a locking mechanism utilizing a perforated indexing locking plate; and further illustrating the frame, the indexing lock mechanism and two positions of the pivoting bridge.

Having reference to FIG. 1, a structure 10 such as a mobile ramp 11 comprises a surface which forms a first platform 12 having a front end 13 positioned adjacent and spaced from a second surface forming a second platform 15. While not shown in great detail, the structure 10 can be an aircraft access ramp 11 which is equipped with wheels (FIG. 2) so as to enable it to be mobile for positioning adjacent the second platform 15, such as an aircraft entry or doorway (See FIG. 9).

A space or gap results between the first and second platforms 12,15. The objective is to move pedestrian or other traffic between the first and second platforms 12,15. Typically, the platforms 12,15 are only approximately arranged at the same elevation and are often misaligned.

A gangway 16 is used to bridge the gap. The gangway 16 comprises a bridge 17 mounted at a proximal end 18 to the structure 10. The bridge 17 extends outwardly from the first platform 12 so that a distal end 19 reaches towards the sill 15a of the second platform 15. If there is some existing disparity or potential variation in elevations between the platforms 12,15, the bridge 17 can be pivotally mounted to the first platform 15 at pivot point 20.

For accommodating maximum flexibility in aligning the bridge 17 to the second platform 15, the pivot point 20 is mounted to a movable frame 25 located beneath the first platform 12. The frame 25 has a front end 26 and a rear end 27. The frame 25 is movable relative to the first platform 12 and in an operational or operating plane 30 substantially parallel to the first platform 12. The frame 25 can be translated and rotated within the operation plane in a least a forwards and rearwards direction. Lateral movement further adds alignment versatility to the gangway.

Due to the relative movement of the frame 25 and the first platform 12, a small discontinuity can form between the bridge's pivot point 20 and the first platform 12. This discontinuity can be bridged with an overlapping filler surface 31 including examples such as by using a forward extension of the first platform 12, a rearward extension of the bridge 17 itself, a rearward extension from the front of the frame 26, by a surface formed by the frame 25 itself if it is immediately adjacent beneath the first platform 12, or preferably by a separate interfacing flap 32. The filler surface 31 and first platform 12 form a contiguous surface but are moveable with respect to each other. The gangway 16 between platforms 12,15 therefore comprises the substantially continuous surfaces of the filler surface 31 and the bridge 17.

As shown in FIG. 1 the filler surface 31 comprises an interfacing flap 32 extending rearwardly from the frame's front end 26 to the first platform 12. The contiguous gangway 16 is completed by the portion of the bridge 17 which extends forwards from the frame's front end 26 at the pivot point 20. The interfacing flap 32 can be a rearward extension which is cantilevered from the frame 25 and which is parallel to the first platform (FIGS. 1 and 3). Preferably, the interfacing flap 32 can be pivoted from the frame's front end 26 (FIG. 2) to improve maintenance access to the frame 25 or to provide a closer interface between the first platform 12 and the interfacing flap 32. Note that a pivot point for each of the interfacing flap 32 and the bridge 17 may be the same pivot point 20 or independent and adjacent pivot points 33,20.

The interfacing flap 32 and bridge's pivot point 20 are connected at the frame's front end 26 so that loads imposed on the gangway 16 are transferred into the frame's front end 26. One or more first bearings 40, preferably two bearings 40a,40b, support the frame's front end 26 and act as a fulcrum, forcing the frame's rear end 27 to bear upwardly under load. At least one second bearing 41 restrains the reaction at the frame's rear end 27, maintaining the frame substantially in its operating plane 30. The first and second bearings 40,41 enable relatively frictionless freedom of movement of the frame 25 within the operating plane 30. The first bearings 40 or 40a,40b bear against and are supported upon a planer lower surface 42 which is supported in the structure 10 and is maintained parallel to the first platform 12. The second bearing 41 bears against and is supported by a planer upper surface 43 supported in the structure 10 and which is maintained parallel to the first platform 12. While usual in all cases, depending upon the particular structure 10, the underside of the first platform 12 may conveniently serve as the upper surface 43. The upper and lower surfaces 43,42 are located beneath the first platform 12. The first and second bearings 40,41 sandwich the frame 25 between the upper surface 43 and the lower surface 42 and may comprise: lubricated facing surfaces; ball bearings in races or as shown in this embodiment, preferably some form of swiveling castors.

Figure 8:
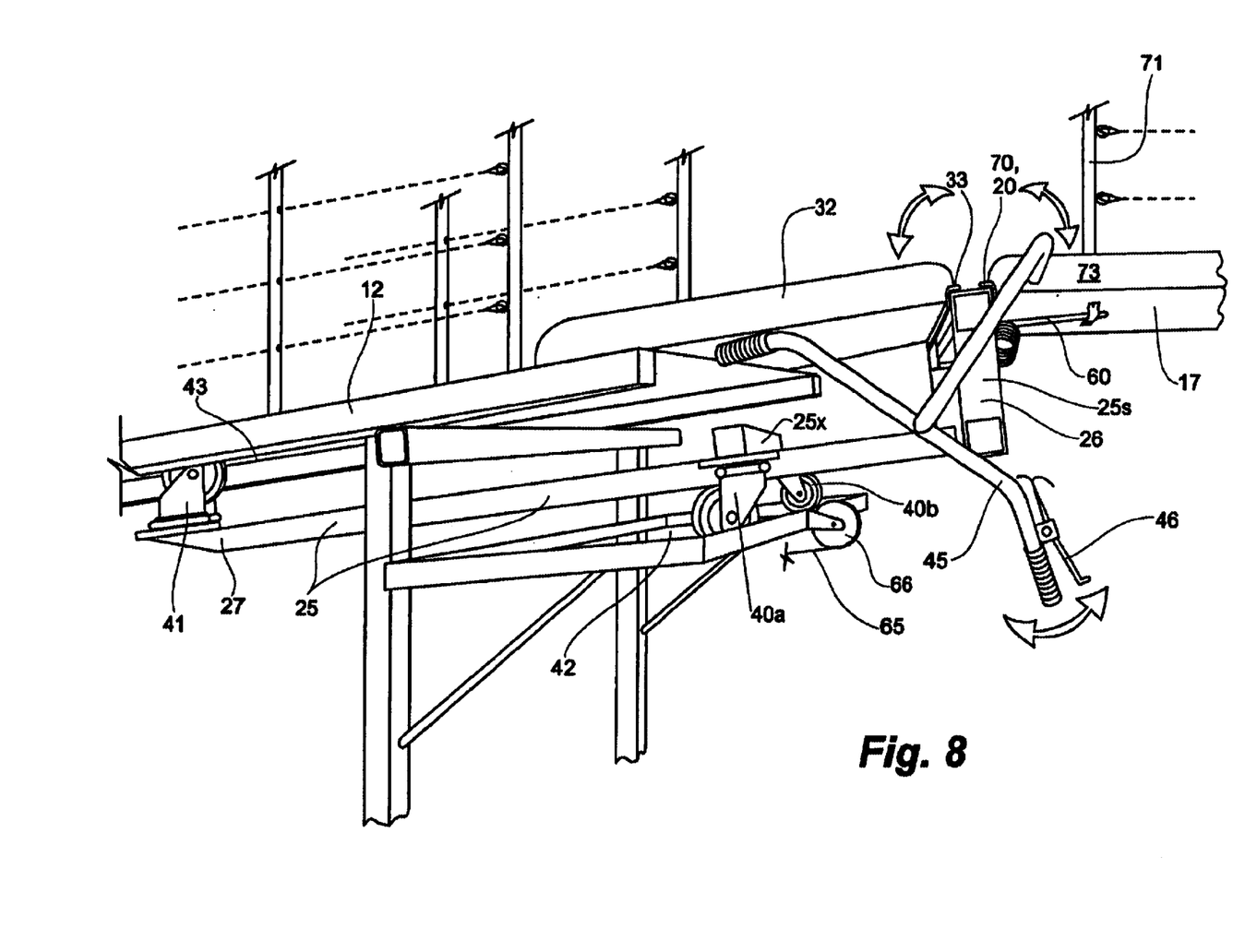
FIG. 8 is a partial perspective view of an embodiment of the invention having a frame using front castors bearing against a lower bearing surface and a rear castor bearing against the underside of the ramp, and having both a flap and a bridge forming the gangway.

An operator can manipulate the movement of the bridge 17 and frame 25 by grasping the bridge directly or via a handlebar 45 which is affixed to the bridge 17 and extending laterally and conveniently to the side (also see FIG. 8). It is also possible to add drive means to aid the operator in manipulating the bridge.

Once the bridge 17 is in position, it is preferably secured with some form of locking means or mechanism 50 to avoid movement and slippage of the bridge 17 from the sill 15a of second platform 15. The frame 25 can be fitted with a first locking means 51a and the structure 10 with a complementary second locking means 51b. When engaged the first and second locking means 51,52 lock the frame's movement relative to the structure 10 and thus arrest or lock the bridge 17 movement. As shown in FIG. 1, one form of locking mechanism 50 comprises a combination of an indexed perforated plate 52 as the second locking means 51b and one or more moveable pins 53 as the first locking means 51a. If there is more than one pin 53, the pins 53,53 . . . and perforations 54 in the plate 52 are cooperatively spaced so as to ensure engagement or one or more of the pins and perforations 53,54 regardless of the position of the frame 25. Each pin 53 is actuable between a released position, free of the perforated plate 52, and a locked position, engaged in one of the perforations 54 in the plate 52. To further ensure safety in operation, a "deadman" or normally-locked system is employed. A spring 47 normally drives the pin 53 into the locked position which is only overcome and moved to the released position upon manual actuation by the operator manipulating the bridge 17. A mechanism for releasing the pin 53 could include a sheathed cable 48 between a hand lever 46 and the pin or pins 53 as shown in the simplified schematic arrangement of FIG. 1. The relative frame 25 or structure 10 mounting of the pins 53 and the perforated plate 52 could be reversed mounted.

Figure 2:
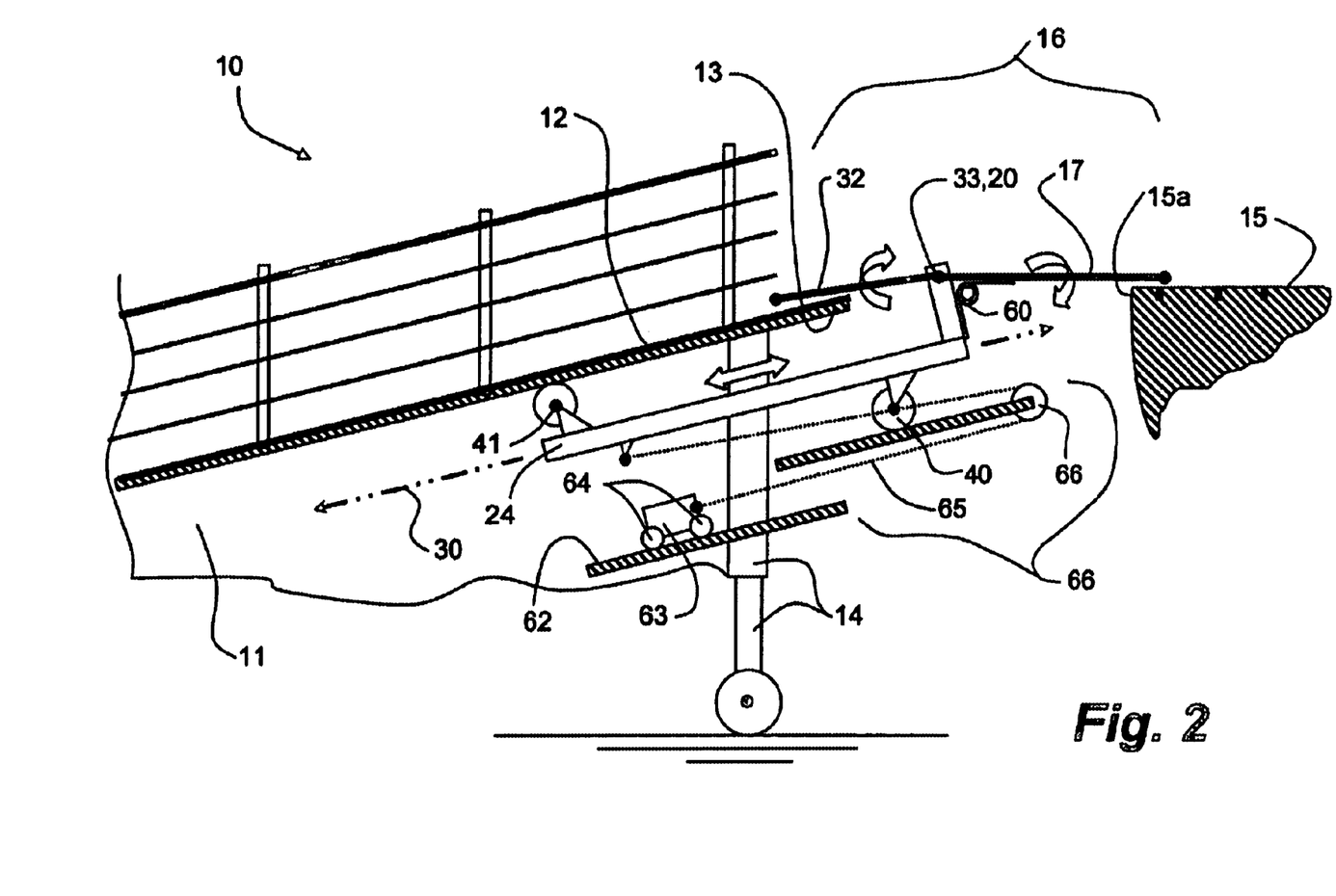
FIG. 2 is a side schematic view of a ramp embodiment of the invention illustrating forward and rearward movement of the frame and pivoting action of the flap and the bridge.
Figure 3:
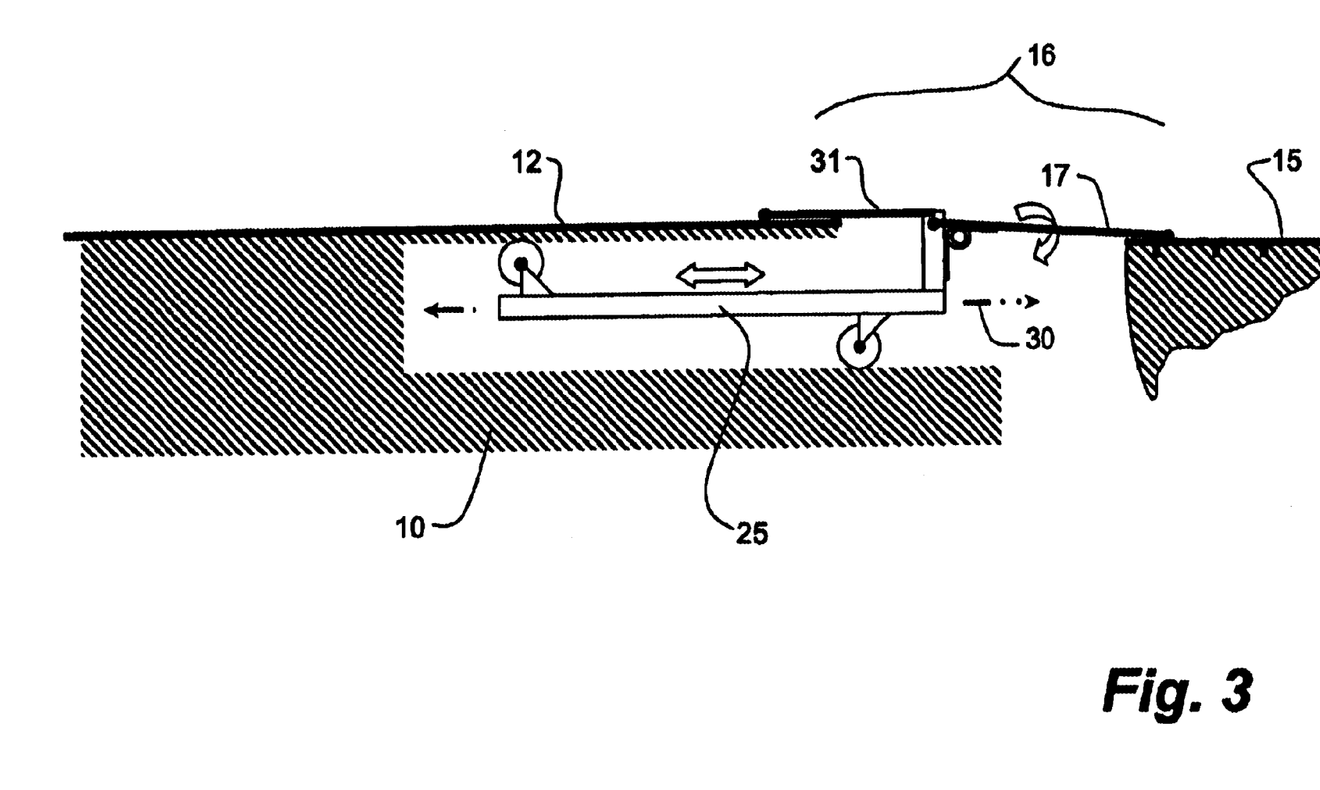
FIG. 3 is a side schematic view of a loading dock embodiment of the invention illustrating forward and rearward movement of the frame and pivoting action of the flap and the bridge.

As shown in FIG. 2, the first platform 12 is supported in a ramp 11 having means 14 for adjusting the elevation of the first platform's front end 13. Accordingly, the angle of the ramp and first platform 12 can be varied. The interfacing flap 32 and bridge 17 rotate at their respective pivot points 33,20 so as to maintain continuity. The handle bars 45 and indexed locking system 50 are not shown in FIG. 2 so as to avoid obscuring additional of the embodiments of the invention. The bridge 17 may be fitted with handrails 71 (See FIG. 4c.) which contributes to the bridge's weight. Accordingly and advantageously, some form of counterbalance means is provided for resisting the tendency of the bridge 17 to rotate abruptly under gravity when being lowered to the second platform 15. A biasing means such as a form of spring 60 is shown at the juncture of the frame 25 and bridge 17 to counteract or balance the offset weight of the bridge 17 about its pivot pint 20. A suitable spring 60 is a coil spring having its ends secured to the bridge 17 and the frame 25 respectively.

Another challenge posed by variable and increasing the angle of the first platform 12 is that the movable frame 25 inherently wishes to move down slope along its operating plane 30 under the increasing influence of gravity. As the angle of the first platform moves off horizontal and the angle increases, the operator must overcome increasing weight of the frame.

One approach is to use the handle bars 45 affixed to the bridge as shown in FIG. 1 and strongly manhandle the bridge 17. While not essential, further assistance can be provided in manipulating or repositioning of the frame 25 by preferably providing a counterweight system 61 to counteracts the loads associated with the frame 25. A planer counterweight supporting surface 62 is provided which is supported in the structure 10 and which is maintained parallel to the first platform 12. A counterweight 63 is moveable on the counterweight support surface 62, preferably on rollers 64. A flexible tension member such as a cable 65 extends between the frame 25, forwards around a turning bearing or pulley 66 and back for connection to the counterweight 63. In operation, an increase in angle of the frame's operation plane 30 also increases the angle of the counterweight's supporting surface 62, permitting the counterweight 63 to impose a frame-counterbalancing force, through the cable 65.

Having reference to FIG. 3, as shown in an optional loading dock embodiment, where the first platform remains substantially horizontal, a frame counterweight system is of little assistance and is not provided.

Figures 4A, 4B, 4C:
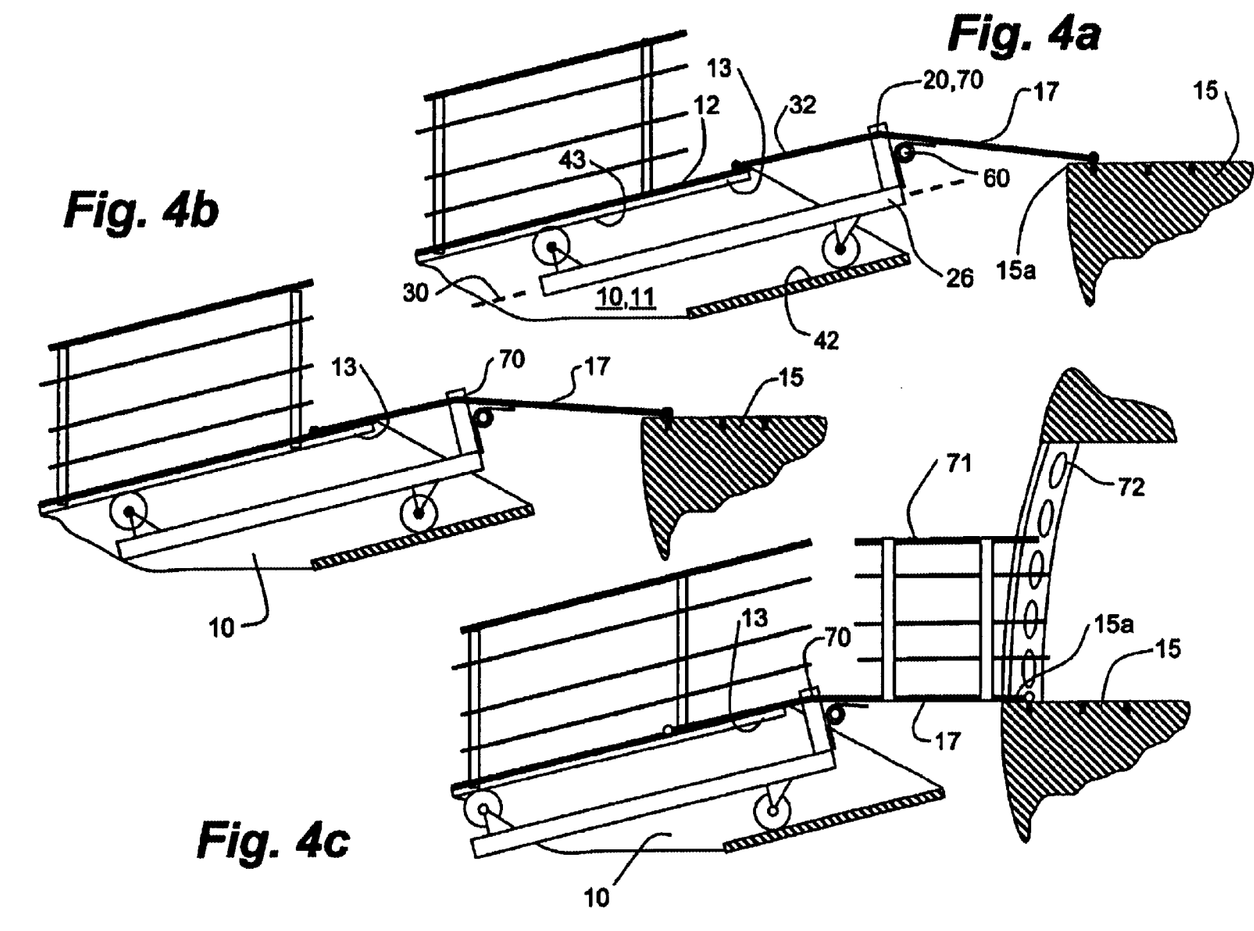
FIGS. 4a–4c illustrate side schematic views accordingly to FIG. 2 and which show three stages of rearward movement of the frame with the gangway reaching three different extents on the target surface.

In operation, and having reference now to FIGS. 4a–4c, the bridge's pivot point 20 is a hinge 70 mounted to the frame's front end 26. The hinge 70 is offset upwardly from the frame's operating plane 30. Accordingly, in use, both the flap 32 and the bridge's hinge 70 lie substantially in the plane of the first platform 12.

As shown in FIGS. 4a–4c, due to a variety of constraints on the ground, the relative positioning of the platforms 12,15, or merely the actions of the operator, the resulting relative end position of the first and second platforms 12,15 may be at any of a variety of locations, resulting in spacing or gaps of variable distance. Accordingly, for a large gap as shown in FIG. 4a, the frame 25 is moved considerably forwards in its operating plane 30, so as to translate the bridge 17 forwards to reach the second platform 15. The bridge 17 is pivotally lowered to engage the second platform's sill 15a. For medium and smaller gaps, the frame can be moved progressively forwards or rearwards so that the bridge engages the sill 15a.

As is shown in FIG. 4c, the ability to manipulate the bridge is particularly advantageous when there are lateral constraints as well. As illustrated, the bridge and any handrails 71 are manipulated to fit within a framed doorway 72 of the second platform 15.

Figure 5A:
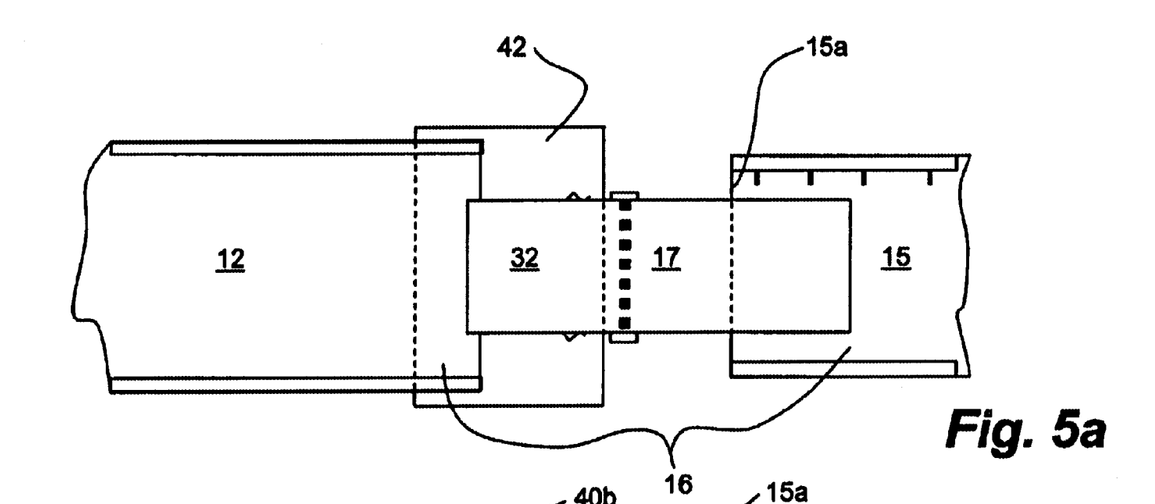
FIGS. 5a and 5b illustrate top schematic views accordingly to FIG. 2, FIG. 3a illustrating the lateral, forward and rearward extent of the lower bearing surface shown in hidden lines under the ramp and the gangway.
Figure 5B:
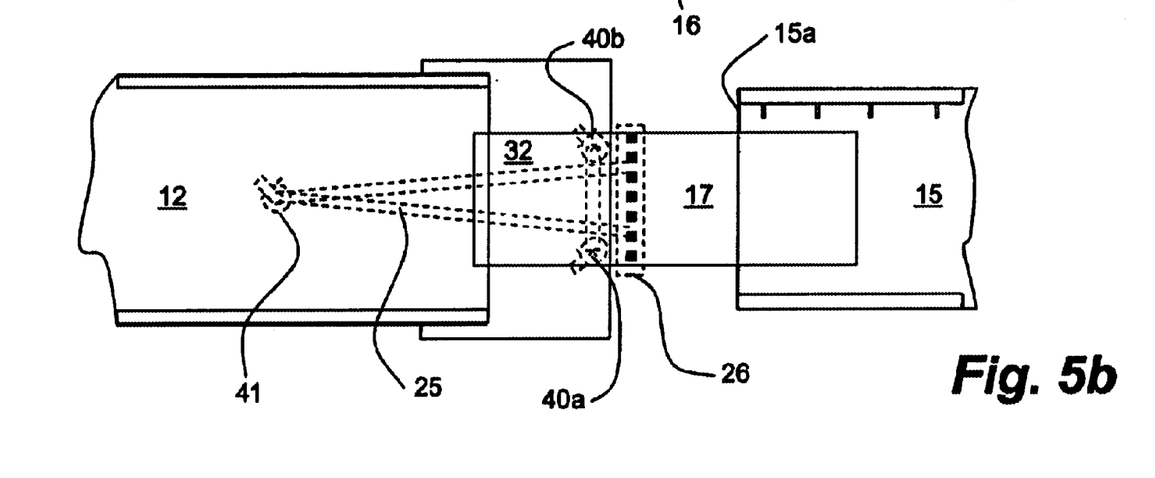

Having reference to FIGS. 5a and 5b, the first and second platforms 12,15 are shown in plan view with the gangway 16 extending therebetween. In FIG. 5a, the outline of the entire planer surface of the lower support 42 is shown in hidden lines as necessary where it is obscured by the first platform 12. In FIG. 5b, the frame 25 and the first and second bearings 40a,40b,41 are shown in hidden lines beneath the first platform 12 and gangway 16 respectively. The frame 25 is shown as a triangular structure having two first bearings 40a,40b at the frame's front end 26 and which are shown as being freely swiveling castors (see also FIG. 8). One freely swiveling castor is provided as the second bearing 41 at the frame's rear end.

Turning to FIGS. 6a, 6b, 7a and 7b, the extent of movement and the capability of the gangway 16 to be manipulated in the operating plane 30 through a variety of translations and rotations are shown. Throughout, the frame 25 is illustrated in hidden lines beneath the first platform 12 and gangway 16.

Figure 6A:
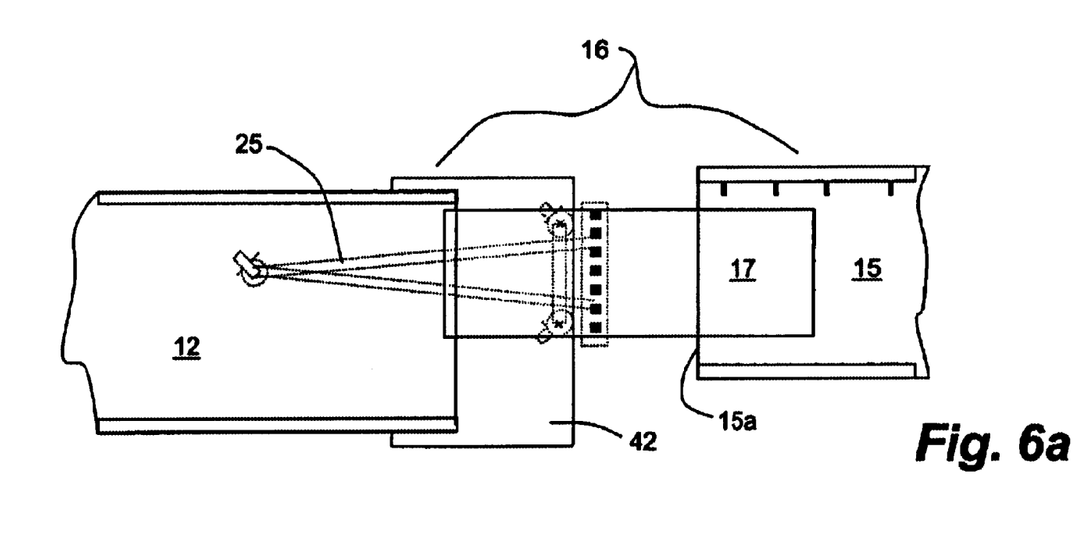
FIGS. 6a and 6b illustrate top schematic views accordingly to FIG. 2 wherein the frame is translated both laterally and fore and aft so as to successfully position the gangway onto the target surface despite the ramp being offset to one side and alternatively being close to or spaced from the target surface respectively.

FIG. 6a illustrates translation of the gangway 16 and frame 25 forwards to reach a distant second platform 15.

Figure 6B:
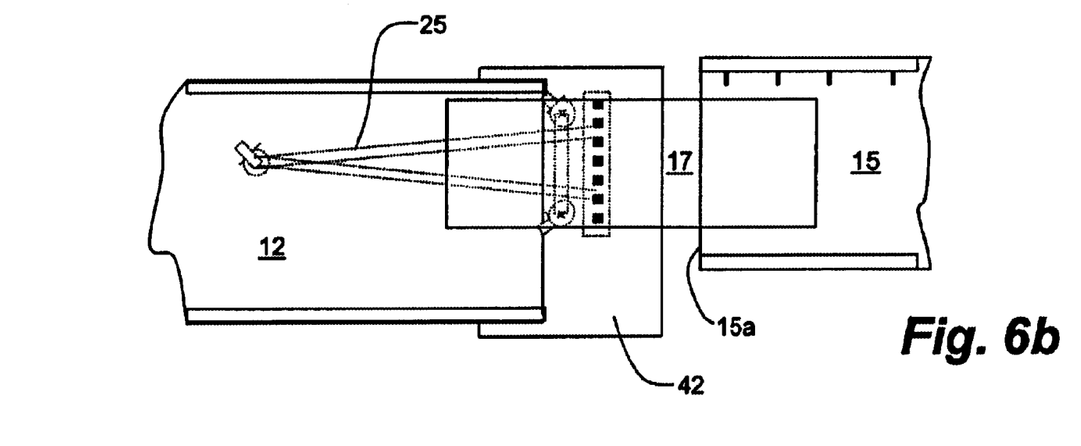

FIG. 6b illustrates translation of the gangway where the second platform 15 is more closely spaced. Both FIGS. 6a and 6b illustrate the capability for lateral translation which accommodates side to side misalignment of the first platform 12 and a dimensionally constricted second platform 15 (such as a framed doorway 72—see FIGS. 4c and 9).

Figure 7A:
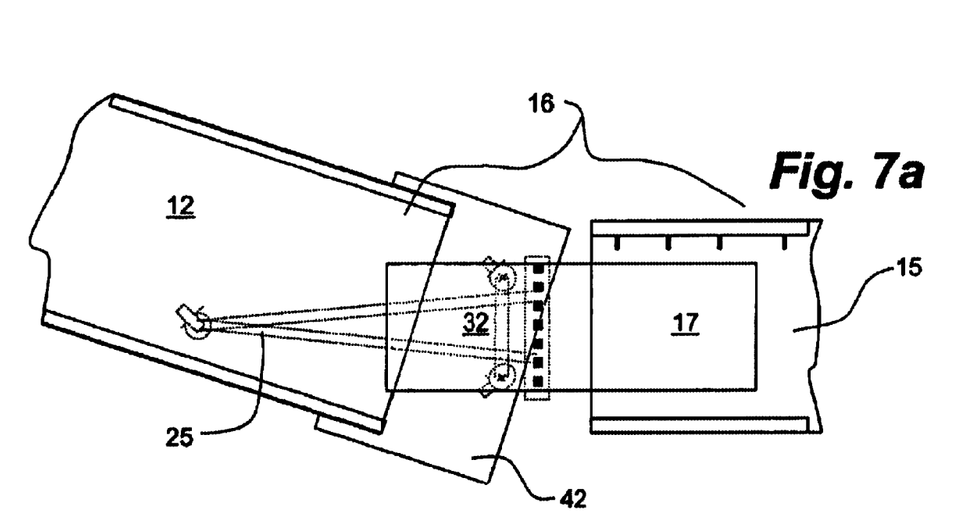
FIGS. 7a and 7b illustrate top schematic views accordingly to FIG. 2 wherein the frame is rotated and translated so as to successfully position the gangway onto the target surface despite the ramp being angularly misaligned from the target surface one way or the other respectively.
Figure 7B:
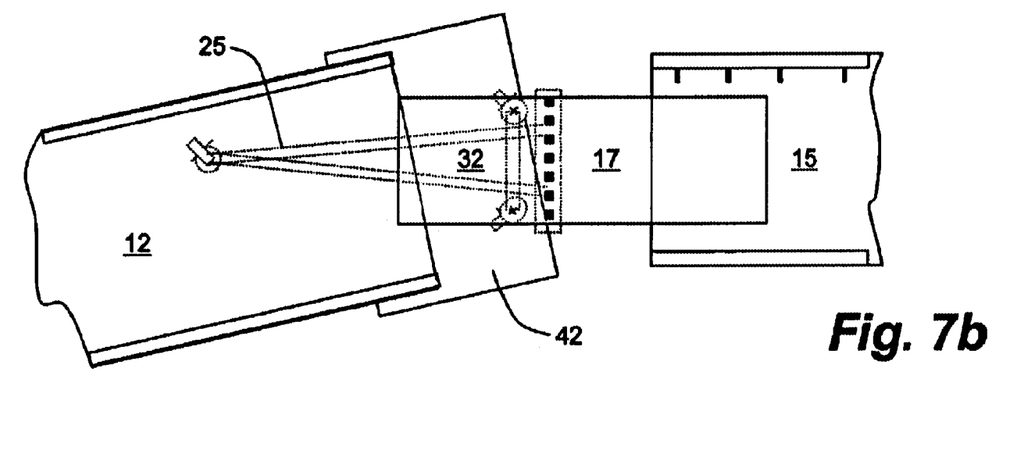

FIGS. 7a and 7b illustrate angular misalignment of the first platform 12, while permitting rotation of the frame 25 and gangway 16 to align properly with the second platform 15.

Having reference now to FIG. 8, in one detailed embodiment of the invention, the frame's front end 26 is shown supported or bearing against the lower support on two laterally-spaced swiveling castors 40a,40b. A form of the frame 25 having castors is illustrated, in a schematic form, in FIG. 5b. The castors 40a,40b are mounted to the underside of a cross member 25x extending across the frame 25. A single swiveling castor 41 is mounted to the top of the frame 25 adjacent its rear end 27. The bridge 17 is pivoted outwardly from a first hinge 70 mounted to the top of a standoff 25s extending upwardly from the frame's front end 26. The handlebars 45 are shown secured to a side edge 73 of the bridge 17. A frame lock actuator lever 16 is partially represented on the right-hand end of the handlebars 45. The flap 32 is shown pivoted from a second hinge 70b also mounted to the standoff 25s.

Figure 9:
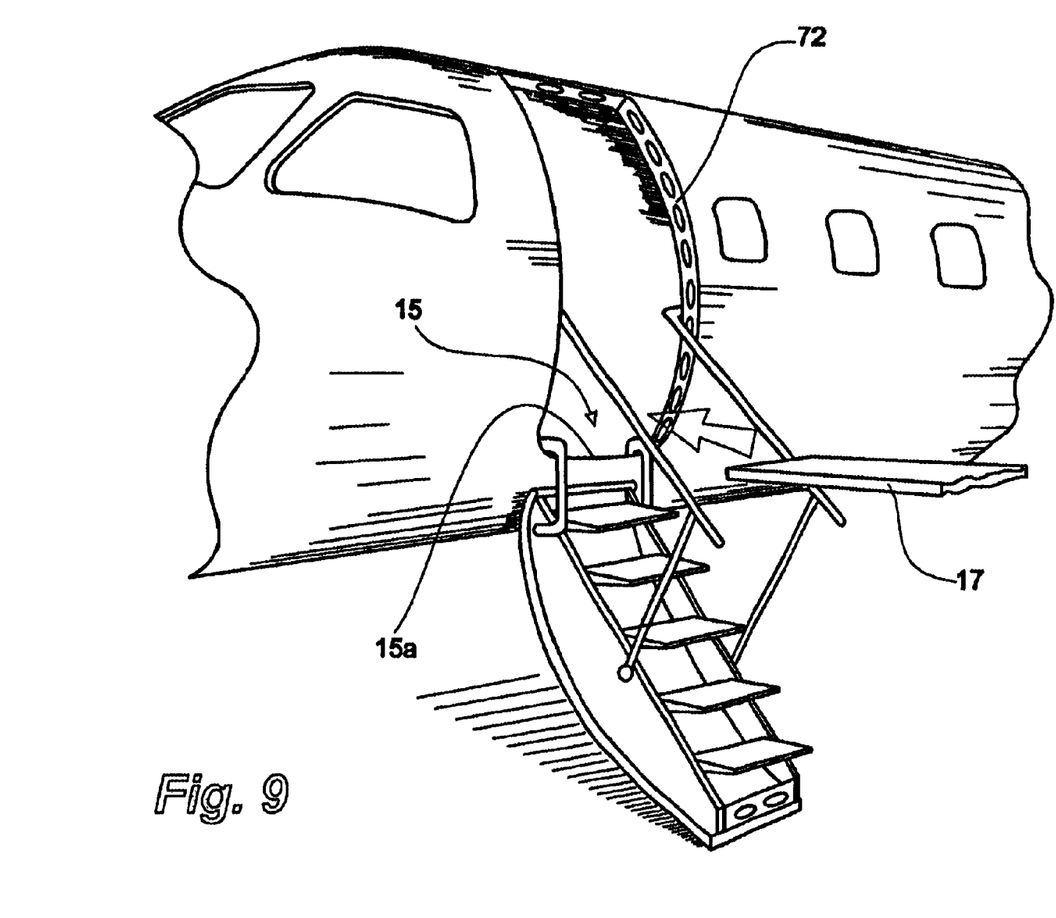
FIG. 9 illustrates one application in which the invention is useful for enabling a gangway to aligning between narrowly spaced handrails of an aircraft cabin door.

As an example of a situation involving a constricted or constrained second platform, and referring to FIG. 9, one embodiment of the present invention enables access to the constricted doorway of a small commercial aircraft. The end of the bridge 17 is shown approaching the sill 15a of the doorway platform 15, while also accurately negotiating between fixed and narrow handrails 73.

Figure 10:
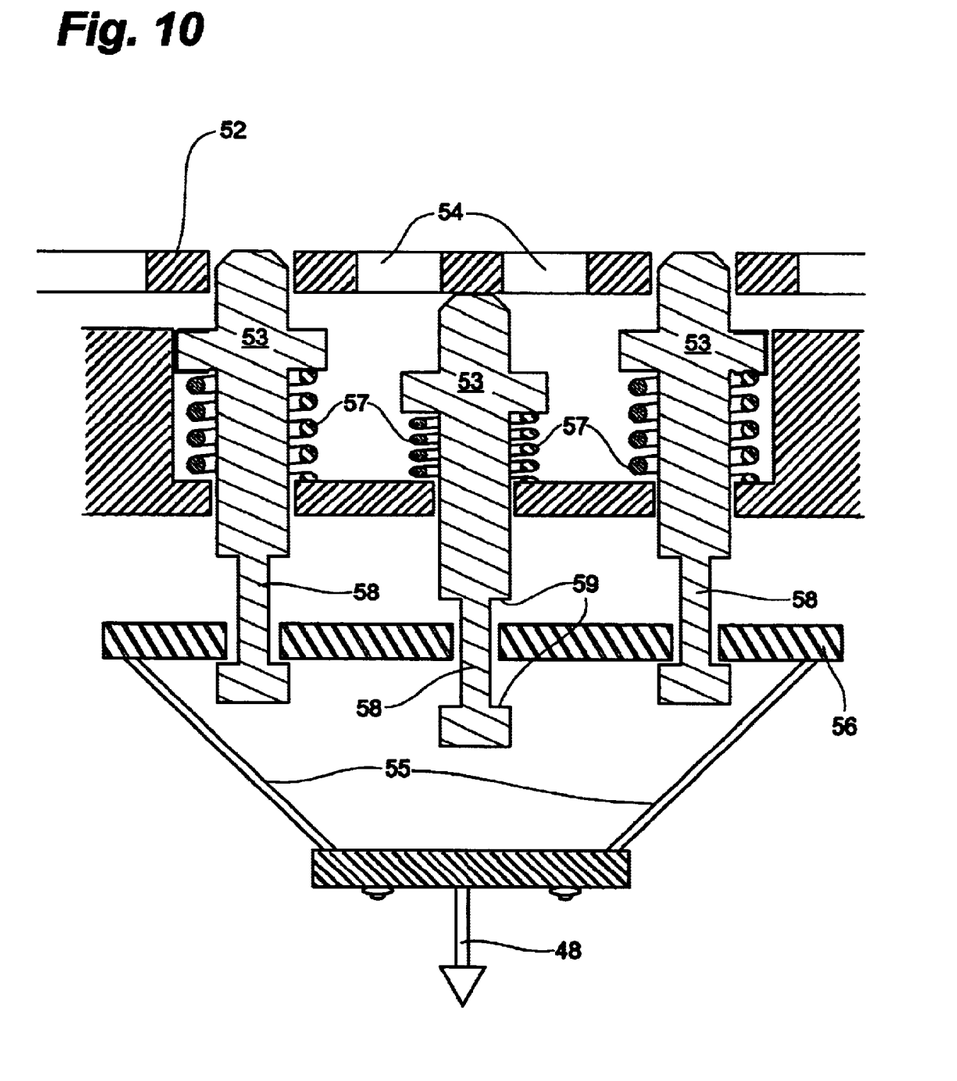
FIG. 10 is an alternate embodiment of the locking mechanism which locks all movement of the frame and supported gangway.

Having reference to FIG. 10, an alternate locking mechanism 50 comprises two of more arrays of spring loaded pins 53. The pins 53 can be gang-retracted from their normal position using a mechanism to release the pins 53 from the perforated plate 52 and thereby unlock the frame 25 for movement. A cable 55 extending from a hand release 46 can pull a yoke 56 so as to simultaneously to retract all the pins 53. When the yoke and pins 53 are released, biasing springs 57 driven the pins 53 towards the plate 52 so that one or more of the pins will engage a cooperating perforation 54 and provide a secure, safe and trustworthy lock. Each pin 53 is illustrated having a small shank 58 forming range of motion shoulders or stops 59 which cooperate with the yoke 56.

It is understood that there are a variety of structures and platforms to which the method and apparatus of the floating gangway can be applied, whether the structure is mobile or stationary. There are many forms of frame support, bearings and braking mechanism which can be drawn from the prior art which enable the movement and locking of the frame in its operating plane. A variety of known drive mechanisms can be added to assist the operator in manipulating the various masses of the structure, frame and gangway and automating the alignment of the gangway.

The embodiments of the invention for which an exclusive property or privilege is claimed are defined as follows:

1. Apparatus for bridging between a first platform spaced from a second platform comprising:
   a movable frame positioned below the first platform and substantially parallel thereto, the frame having a front end and a rear end and movable for translation or rotation within an operating plane; and
   a bridge extending forward from the frame's front end for extending between the first platform and the second platform, the bridge being pivotally connected to the frame at a pivot and the bridge weight being counterbalanced about the pivot by a spring acting relative to the frame, and so that, as the frame moves within its operating plane, the bridge also translates or rotates with respect to the second platform.

2. Apparatus for bridging between a first platform spaced from a second platform comprising:
   a movable frame positioned below the first platform and substantially parallel thereto, the frame having a front end and a rear end and movable for translation or rotation within an operating plane;
   a bridge extending forward from the frame's front end for extending between the first platform and the second platform;
   a lower bearing surface positioned below the frame and parallel to the operating plane;
   an upper bearing surface positioned spaced above and parallel to the operating plane, the frame being movably supported between the upper and lower bearing surfaces in the operating plane;
   one or more first bearings positioned rearwardly from the bridge pivot and for moveably supporting the front end of the frame so that downward load on the bridge loads the front end of the frame and causes the first bearings to bear against the lower bearing surface and causes the rear end of the frame to rotate upwardly; and
   one or more second bearings positioned rearwardly of the first bearings so that, as the rear end of the frame rotates upwardly, the second bearings bear upwardly against the upper bearing surface so that, as the frame moves within its operating plane, the bridge also translates or rotates with respect to the second platform.

3. The apparatus of claim 2 wherein the bridge is pivotally connected to the frame at a pivot.

4. The apparatus of claim 3 wherein the bridge further comprises a flap extending rearwardly from the frame for interfacing between the bridge and the first platform as the frame moves.

5. The apparatus of claim 4 wherein the interfacing flap is pivoted from the frame.

6. The apparatus of claim 3 wherein the weight of the bridge is substantially counterbalanced about the pivot.

7. The apparatus of claim 2 wherein:
   the first bearings comprise two or more freely swiveling front castors mounted to an underside of the frame, at least of two of which are spaced laterally; and
   the second bearings comprise at least one freely swiveling rear castor mounted to a top of the frame, the front and rear castors permitting substantially full two dimensional translation and rotation of the frame in the operating plane so as to align the bridge with the second platform.

8. The apparatus of claim 7 wherein the angle of the first platform can be varied from horizontal and the apparatus further comprises a system for counteracting frame loads, the system comprising:
   a counterweight surface positioned below the first platform and substantially parallel to the operating plane;
   a counterweight supported moveably on the counterweight surface; and
   a flexible tensile member extending forwards from the frame, around a turning bearing surface and back to the counterweight, so that as the first platform is angled from horizontal, the tendency of the frame to move down slope is counteracted by the counterweights tendency to move down slope.

9. The apparatus of claim 8 wherein the turning bearing surface is a pulley mounted adjacent the front of the lower beating surface.

10. The apparatus of claim 7 wherein the lower bearing surface has a breadth which is greater than the lateral spacing of the front casters.

11. The apparatus of claim 10 wherein the second platform is an aircraft doorway.

12. The apparatus of claim 11 wherein the first platform is a passenger ramp.

13. The apparatus of claim 7 further comprising a mechanism for locking the frame relative to the first platform whereby movement of the bridge from the second platform is avoided.

14. The apparatus of claim 13 wherein the locking mechanism comprises:
a first locking means fitted to the frame; and
a second locking means fitted to the first structure which is complementary for locking with the first locking means.

15. The apparatus of claim 14 wherein the first and second locking means comprise, in any order:
an indexing flap having perforations; and
one or more moveable pins, the pins and perforations being cooperatively spaced to ensure engagement of one or more of the one or more moveable pins regardless of the position of the frame.

16. Apparatus for bridging between a mobile structure spaced from an aircraft doorway comprising:
a movable frame positioned below the mobile structure and substantially parallel thereto, the frame having a front end and a rear end and movable for translation or rotation within an operating plane, the mobile structure having an access platform which can be positioned adjacent but not necessarily aligned with the aircraft doorway;
a gangway extending forward from the frame's front end for extending to the aircraft doorway and so that, as the frame is manipulated to move within its operating plane, the gangway also translates or rotates with respect to the aircraft doorway for alignment therewith;
a lower bearing surface positioned below the frame and parallel to the operating plane; and
an upper bearing surface positioned spaced above and parallel to the operating plane, the frame being movably supported between the upper and lower bearing surfaces in the operating plane, one or more first bearings positioned rearwardly from the gangway pivot for moveably supporting the front end of the frame so that downward load on the gangway loads the front end of the frame and causes the first bearings to bear against the lower bearing surface and causes the rear end of the frame to rotate upwardly; and
one or more second bearings positioned rearwardly of the first bearings so that, as the rear end of the frame rotates upwardly, the second bearings bear upwardly against the upper bearing surface, so that the gangway can be aligned therewith by manipulating the frame to move within the operating plane.

17. The apparatus of claim 16 wherein:
the first bearings comprise two or more freely swiveling front castors mounted to an underside of the frame, at least of two of which are spaced laterally; and
the second bearings comprise at least one freely swiveling rear castor mounted to a top of the frame, the front and rear castors permitting substantially full two dimensional translation and rotation of the frame in the operating plane so as to align the bridge with the aircraft doorway.

18. The apparatus of claim 17 wherein the lower bearing surface has a breadth which is greater than the lateral spacing of the front casters so as to enable lateral movement of the frame.

19. The apparatus of claim 16 wherein the gangway is pivotally connected to the frame about a pivot.

20. The apparatus of claim 19 wherein the gangway further comprises a flap extending rearwardly for into acing between the gangway and the first platform as the frame moves, the interfacing flap being pivoted from the frame.

21. The apparatus of claim 19 wherein the weight of the gangway is substantially counterbalanced about the pivot.

22. The apparatus of claim 21 wherein the gangway is counterbalanced by a spring acting relative to the frame.

23. The apparatus of claim 16 further comprising a mechanism for locking the frame relative to the first platform for avoiding movement of the bridge from the second platform.

24. The apparatus of claim 23 wherein the looking mechanism comprises:
a first locking means fitted to the frame; and
a second locking means fitted to the first structure which is complementary for locking with the first locking means.

25. The apparatus of claim 24 wherein the first and second locking means comprise, in any order:
an indexing flap having perforations; and
one or more moveable pins, the pins and perforations being cooperatively spaced to ensure engagement of one or more of the one or more movable pins regardless of the position of the frame.

26. Apparatus for bridging between a mobile structure spaced from an aircraft doorway comprising;
a movable frame positioned below the mobile structure and substantially parallel thereto, the frame having a front end and a rear end and movable for translation or rotation within an operating plane, the mobile structure having an access platform which can be positioned adjacent but not necessarily aligned with the aircraft doorway; and
a gangway extending forward from the frame's front end for extending to the aircraft doorway and so that, as the frame is manipulated to move within its operating plane, the gangway also translates or rotates with respect to the aircraft doorway for alignment therewith,
wherein the gangway is pivotally connected to the frame about a pivot and the weight of the gangway is substantially counterbalanced about the pivot by a spring acting relative to the frame.

* * * * *